United States Patent [19]

Hawkins et al.

[11] Patent Number: 4,901,323
[45] Date of Patent: Feb. 13, 1990

[54] LASER PULSE STRETCHER METHOD AND APPARATUS

[75] Inventors: Jon K. Hawkins, Naperville; William A. Williams, Burr Ridge, both of Ill.

[73] Assignee: Universities Research Association, Inc., Batavia, Ill.

[21] Appl. No.: 45,829

[22] Filed: May 1, 1987

[51] Int. Cl.⁴ .................................................. H01S 3/10
[52] U.S. Cl. ...................................... 372/25; 372/29; 372/38
[58] Field of Search .................. 372/25, 10, 11, 9, 38, 372/18, 20, 29-32

[56] References Cited

U.S. PATENT DOCUMENTS

| | | | |
|---|---|---|---|
| 3,747,019 | 7/1973 | Koechner et al. | 331/94.5 |
| 3,898,583 | 5/1975 | Shuey | 331/94.5 |
| 3,902,130 | 8/1975 | Pike | 372/25 |
| 3,914,709 | 10/1975 | Pike et al. | 372/11 |
| 4,025,875 | 5/1977 | Fletcher et al. | 331/94.5 |
| 4,319,203 | 3/1982 | Brosio et al. | 372/30 |
| 4,375,684 | 3/1983 | Everett | 372/18 |
| 4,400,812 | 8/1983 | Clark et al. | 372/29 |
| 4,468,776 | 8/1984 | McLellan | 372/93 |
| 4,483,005 | 11/1984 | Smart | 372/25 |
| 4,504,951 | 3/1985 | McMahan et al. | 372/38 |
| 4,611,270 | 9/1986 | Klauminzer et al. | 372/30 |
| 4,633,475 | 12/1986 | Harter et al. | 372/25 |

OTHER PUBLICATIONS

Panarella et al., "Controlled Timewise Redistribution of Laser Energy", *IEEE Journal of Quantum Electronics*, May, 1975, pp. 181-185.

W. E. Schmid, "Pulse Stretching in a Q-Switched Nd:YAG Laser", *IEEE Journal of Quantum Electronics*, vol. QE-16, No. 7, Jul. 1980, pp. 790-794.

*Primary Examiner*—William L. Sikes
*Assistant Examiner*—B. R. R. Holloway
*Attorney, Agent, or Firm*—Neuman, Williams, Anderson & Olson

[57] ABSTRACT

The output of an oscillator stage of a laser system is monitored by a photocell which is coupled to a feedback section to control a Pockels Cell and change the light output of the oscillator stage. A synchronizing pulse is generated in timed relation to the initiation of operation of the oscillator stage and is applied to a forward feed section which cooperates with the feedback section to maintain the light output constant for an extended time interval.

20 Claims, 3 Drawing Sheets

LASER PULSE STRETCHER METHOD AND APPARATUS

This invention was made with Government support under Contract No. DE-ACO2-76CH03000 awarded by the U.S. Department of Energy. The Government has certain rights in the invention.

This invention relates to the use of lasers in generating light pulse and more particularly to a method and apparatus for controlling a laser to generate light pulses of extended duration and of substantially constant intensity. With the method and apparatus of the invention, a highly stable operation is obtained in which the intensity of the light pulses and the duration thereof are accurately and efficiently controlled with a high degree of reliability. The invention is versatile in being applicable to lasers of different types and characteristics and it achieves other important advantages.

BACKGROUND OF THE INVENTION

Solid state lasers are generally operative either in a normal or free-lasing mode or in a switched or "Q" mode. In the normal mode, a pulse envelope is produced which may typically be of about 1 microsecond in duration, consisting of 15 to 30 spike, each spike being of 30 to 100 nanoseconds duration. In the switched or "Q" mode, a single pulse is produced, typically of 20 to 100 nanoseconds duration. In the laser art, "Q" is defined as the ratio of energy stored in the laser cavity to energy loss per round trip passage of light. In the switched or "Q" mode, means such as a Pockels Cell are provided for controlling the Q which may be kept at a low value while energy is stored by optical pumping. Then the Q is switched to a high value to release the stored energy, a pulse of very high intensity and short duration being thereby produced. It has been recognized that the generation of such a pulse is highly advantageous for certain applications and considerable research and development efforts have been directed toward perfecting the switched or "Q" mode technique.

This invention is directed to the generation of a "stretched" pulse of long duration but of low intensity which has not been generally recognized as being highly desirable but which has been investigated and used. In certain proposed systems, the light is modulated through passive techniques, as by using a non-linear doubling crystal or by lengthening the oscillator cavity. Such passive techniques have serious limitations in that they produce light pulses whose time variation is either gaussian or extremely asymmetric. In other proposed systems, the light is modulated through active techniques, as by using a feedback loop in which a portion of the output of a laser beam is sampled by a photodiode and used to control a Pockels Cell in the oscillator cavity. For example, in an article entitled *"Controlled Timewise Redistribution of Laser Energy"* by Emilio Panarella and Lorne L.T. Bradley, *IEEE JOURNAL OF QUANTUM ELECTRONICS*, VOL. QE-11, No. 5, May 1975, an electronic feedback circuit is described for a Nd:glass high-power laser system for converting the spikey light emission into a smooth near-rectangular output of adjustable intensity and duration. The voltage at one electrode of a Pockels Cell is directly controlled by a photodiode which is connected in series with an adjustable resistance across a −3KV voltage source, a constant bias voltage being applied to the other electrode. Another active technique is described in an article entitled *"Pulse Stretching and Shape Control by Compound Feedback in a Q-SWitched Ruby Laser"* by R. V. LovBerlg, et al. *IEEE J. Quantum Electronics*, Vol. OE-11, No 1, pp. 17-21, January 1975.

SUMMARY OF THE INVENTION

This invention was evolved with the general object of providing methods and apparatus for obtaining "stretched" laser pulses of extended duration and of substantially constant duration with a high degree of efficiency, accuracy and reliability, while using standard available components and otherwise minimizing expense. Such stretched laser pulses can be used advantageously in holographic bubble chambers systems and have other potential applications.

An important aspect of the invention relates to the discovery and recognition of the sources of problems with systems as proposed in the prior art. As aforementioned, passive techniques have serious limitations. Active techniques, using a Pockels Cell controlled by a photodiode in a feedback loop, present a problem with respect to the gain-bandwidth requirements which are determined by the dynamics of the laser oscillator. In order to properly control or "stretch" the light produced by a solid state laser, random output fluctuations must be suppressed and the delay time must be less than the duration of individual spikes which is typically 50 to 500 nanoseconds, so that the control means should respond to a frequency of at least 20 MHz. At the same time, since an output pulse of long duration is desired, the control means should also have a response characteristic which extends down to quite low frequencies and hence a wideband response characteristic is required. In addition, the typical Pockels Cell requires high voltages for operation, on the order of 1 KV or more imposing further problems in implementation o f the control means. A further problem arises from the nonlinear dynamic characteristics of a laser oscillator which are such that conventional linear feedback designs are not suitable. The method and apparatus of the invention take into account these are other problems and considerations which are involved in the use of a Pockels Cell in stretching of laser pulses.

In a system constructed in accordance with the invention, an active inverse feedback loop is provided, preferably including and amplifier which is coupled to a Pockels Cell in a laser oscillator stage and an input circuit which is coupled to a photocell arranged to respond to the light output of the oscillator state, the input circuit being operative to develop and apply a control signal to the amplifier input. In addition to the feedback loop, a feedforward control is provided which responds to a synchronizing pulse which is supplied in timed relation to the initiation of operation of the laser oscillator stage. The feedforward control cooperates with the feedback loop in control of the Pockels Cell and a control is obtained such that the laser output is maintained constant to within certain limits for a time period of extended duration which may be from 2 to 10 microseconds, for example.

In accordance with an important feature, the feedback loop has a wideband response characteristic with the upper limit thereof being such that it responds with a delay time which is substantially less than the duration of a random spike which would be produced by the laser oscillator in a free-lasing mode.

Another important feature relates to the provision of a ramp circuit in the feedforward control, operation to apply a voltage to the Pockels Cell which gradually decreases with time during the development of the output pulse. This feature facilitates achievement of the desired control by the feedback loop and enhances the reliability of the system. Preferably, and in accordance with important specific features of the invention, a feedforward control voltage is developed by a capacitor which is charged at a certain level prior to initiation of the lasing operation with a current control circuit being coupled to the capacitor to gradually change its charge and develop a ramp voltage.

A further important feature of the invention relates to the development of the control voltage in the feedback circuit from a comparison of the output of the photocell means with a reference voltage. In the combination of the invention, the use this feature is very important in providing a control which takes into account the nonlinear characteristics of the Pockels Cell-controlled laser oscillator stage and which achieves optimum results with a high degree of reliability.

Still another important feature relates to the use of a fast-slewing differential amplifier in the input section of the feedback control. It is found that the nonlinear characteristics of the Pockels Cell-controlled laser oscillator stage are such that the characteristics of a fast slewing amplifier are particularly well suited for use in control thereof especially when a comparison with a reference voltage is used in the input section. The use of the feedforward ramp voltage is also important in combination with these features of the input section, in placing the control action in a range in which it is possible to achieve optimum control and high stability and reliability while using conventional design criteria for defining the characteristics of the fast slewing differential amplifier and for the comparison of the photocell voltage with the reference voltage.

Additional features of the invention relate to the implementation of the feedback and feedforward controls using circuit components of types which are readily available at relatively low cost. Circuit features are used which permit fast response without producing transient oscillations and field-effect devices such as MOSFETs are used in a manner such as to achieve stable and very fast control of high voltages.

This invention contemplates other objects, features and advantages which will become more fully apparent from the following detailed description taken in conjunction with the accompanying drawings.

DESCRIPTION OF A PREFERRED EMBODIMENT

Figure 1:
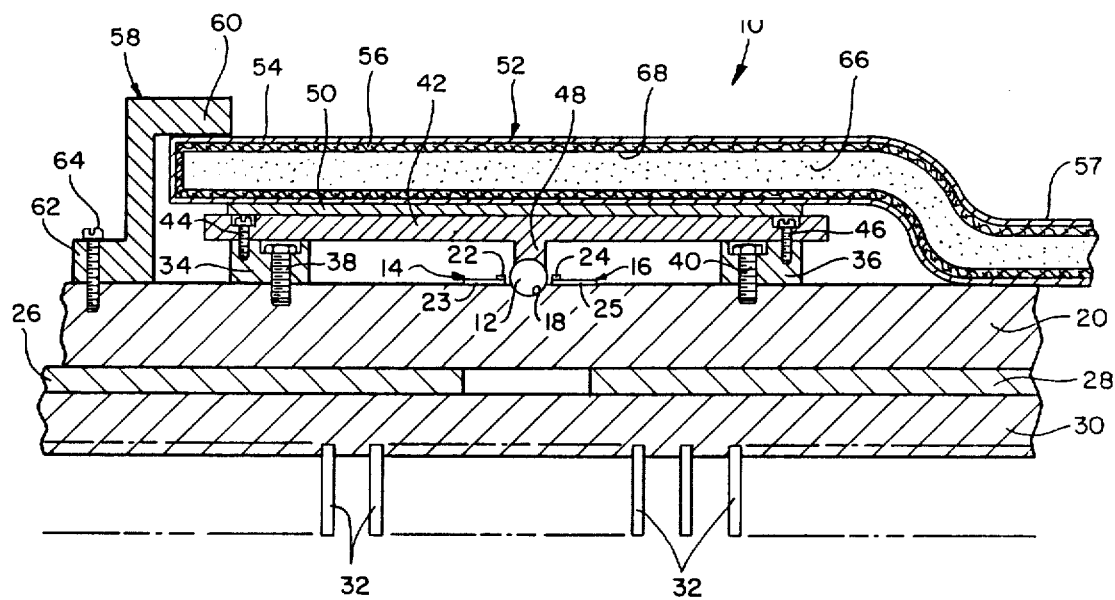
FIG. 1 is a schematic block diagram of laser apparatus which incorporates a pulse stretcher control of the invention.

Reference numeral 10 generally designates laser apparatus which incorporates a pulse stretcher control arrangement, constructed in accordance with the principles of this invention. The illustrated apparatus 10 comprises a holographic ruby laser system 11 of a commercially available J.K. Laser type having an oscillator stage 12 which includes a ruby oscillator 12a and tilted etalons 12b and 12c, altered by replacing a 100% reflective rear mirror with a 80% reflective mirror 13 and by replacing a Pockels Cell supplied with the J.K. Laser system with a Pockels Cell 14 which has quarter wave voltage of 1.15 KV. Light passing though the partially reflective rear mirror 13 is impinged on a photocell 16 after reflection by mirrors 17 and 18, the output of the photocell 16 being used in accordance with the invention in controlling electrical signals applied to the Pockels Cell 14 to control the transmission of light therethrough and thereby the light output of the oscillator stage 12.

Output light from the oscillator stage 12 passes out through a partially reflecting front or output mirror 19 and travels along a path as diagrammatically illustrated to exit along a line 20 after being passing through a focusing lens 21, a spacial filter 22, amplifiers 23, 24 and 25 and a beam expander 26, two pairs of mirrors 27 and 28 being provided to provide 90 degree bends in the light path, as shown. A control unit 30 is associated with the laser system 11 and is operative to develop a pulse which is applied to a gate generator 31 in timed relation to the triggering of a flashlamp (not shown) which initiates lasing operation. It should be understood that the type of laser system and the types of components referred to herein as well as the 80% reflection coefficient, the voltage of 1.15 KV and other values set forth herein are given by way of illustrative example, to facilitate an understanding of the invention, and are not to be construed a limitations. It should also be understood that although a standard type of Pockels Cell is particularly advantageous for use with the apparatus of the invention, other devices might be used and the term "Pockels Cell" is therefore used in a generic sense to include other devices capable of controlling the transmission of light as a function of applied electrical signals, equivalent to the standard type of pockels Cell. The invention may be applied to a variety of types of laser systems and the operating parameters and values and characteristics of the components used may be selected as appropriate, using the principles of the invention as disclosed herein and as exemplified by the illustrated embodiment.

In accordance with the invention, a feedback section 33 and a feedforwad section 34 are provided having output terminals 35 and 36 connected to separate electrodes 37 and 38 of the Pockets Cell 14 and having supply voltage terminals 39 and 40 thereof connected to separate power supplies 41 and 42. An input terminal 43 of the feedback section 33 is connected to the photodiode 16 and an input terminal 45 of the feedforward section 34 is connected through a line 46 to the gate generation to be supplied with a pulse which is in synchronized timed relation to the initiation of the lasting operation. A third power supply 47 is connected to a terminal 48 of the feedback section 33 to supply a relatively high voltage for operation of an input portion coupled to the photodiode 16 and a fourth power supply 50 is connected to terminals 51 and 52 of the section 33 and terminal 53 of the section 34 to supply operating voltages for integrated circuits thereof.

In operation, the control unit 30 applies a triggering pulse to the control section 31 of the laser system 11 to initiate lasing operation and, at the same time, the control unit 30 applies a synchronizing pulse to the input terminal of the feedforward section 34. In response, the feedforward section applies a relatively high voltage to the electrode 38 of the Pockels Cell 14 while the feedback section 33 applies a control voltage to the other Pockels Cell electrode 37. When the light is developed, the photodiode 16 develops a voltage which is applied to the input terminal of the feedback section 33 to be compared with a reference voltage applied within the section 33 a hereinafter described. In proportion to an increase in light above a certain magnitude, as determined by the reference voltage, the feedback section operates to control the voltage applied to the electrode 37 of the Pockels Cell, in a direction to reduce the output of the laser system. In addition, the feedforward section gradually changes the voltage applied to the electrode 38, to prevent light from building up to a level beyond that which might be controlled by the feedback section 33. The overall result is an output light pulse having a long duration and having an amplitude which is maintained within certain limits.

Figure 2:
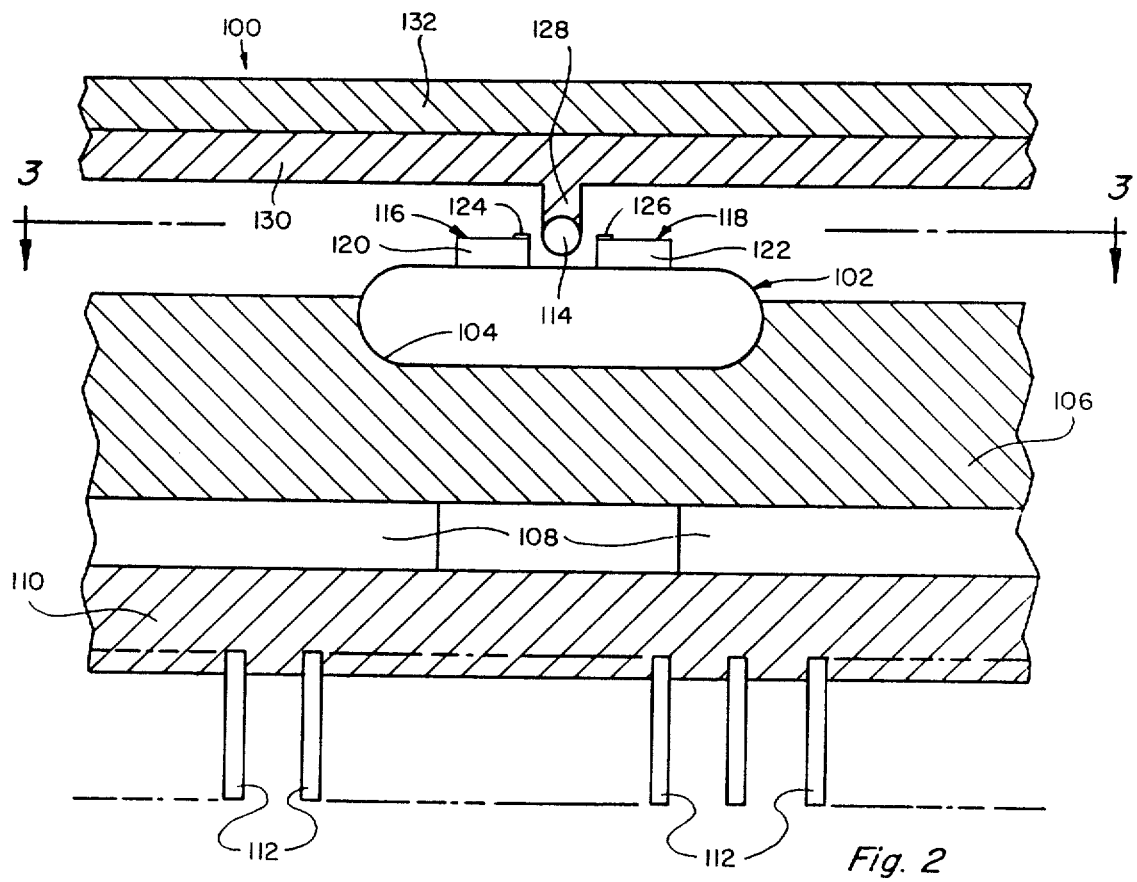
FIG. 2 is a schematic circuit diagram of a feedback section of the apparatus of FIG. 1.

FIG. 2 is a schematic circuit diagram of the feedback section 33. The output terminal 35 is connected through a resistor 54 to the power supply terminal 39 which is connected to ground through a pair of filter capacitors 55. Output terminal 35 is also connected to one output terminal of a control device 56 having a second output terminal connected to ground. Device 56 is controlled to control current conduction therethrough and to thereby control the voltage applied from output terminal 35 to the Pockels Cell 14. It may preferably be a MOSFET, a majority carrier device having a very high switching speed and having other desirable features including the ability to control high current and having very low input or gate drive requirements which are independent of the output load current.

To control the MOSFET 56, a differential amplifier 58 is provided having plus and minus voltage supply terminals connected to terminals 51 and 52 each of which is connected to ground through a pair of by-pass capacitors. The output of amplifier 58 is connected through a resistor 59 to the gate of the MOSFET 56 and is also connected to ground through a resistor 60 and through a pair of resistors 61 and 62 in series, the junction between resistors 61 and 62 being connected to the minus input of amplifier 58 to supply an inverse feedback signal thereto and stabilize operation. A signal is applied to the plus input of amplifier 58 which corresponds to a comparison of the output of the photodiode 16 with a reference or bias level determined by a potentiometer 64 which is connected between the power supply terminal 51 and ground. The movable contact of potentiometer 64 is connected to ground through a pair of by-pass capacitors 65 and is connected to the plus input of amplifier 58 through a resistor 66.

The signal from the photodiode 16 is developed at the input terminal 43 which is connected to one terminal of the photodiode 16 and through a resistor 68 to the voltage supply terminal 48. A second terminal of the photodiode 16 is connected to ground and when the photodiode 16 conducts in proportion to laser light applied thereto, the voltage at the input terminal 43 is dropped proportionately from a high value, close to that of the terminal 48. The photodiode 16 preferably has very fast response characteristics and a relatively large voltage, e.g. 2.5 KV, is preferably supplied from the power supply 47 in order to enhance the speed of response while also obtaining a high signal-to-noise ratio. To supply the photodiode signal to the amplifier 58, input terminal 43 is connected through a coupling capacitor 69 to a circuit point 70 which is connected through a loading resistor 71 to ground and which is also connected through a resistor 72 to the plus input of amplifier 58 with an additional resistor 73 being connected between the plus input of amplifier 58 and ground. Resistor 71 and also resistors 72 and 73 have relatively low values to minimize the effects of shunt capacitances and to obtain fast response characteristics while also reducing the effects of noise signals such as EMI (electromagnetic interference) signals from laser flashlamps and other sources.

By way of illustrative example, and not by way of limitation, the types and values of the illustrated components of the feedback section 33 may be as follows:

| Reference numeral | Type or value |
| --- | --- |
| 54 | 270 ohms |
| 55 | 55 microfarads |
| 56 | Type MFE9200 MOSFET |
| 59 | 27 ohms |
| 60 | 100 ohms |
| 61 | 240 ohms |
| 62 | 51 ohms |
| 66 | 1100 ohms |
| 68 | 1 megohm |
| 71 | 51 ohms |
| 72 | 100 ohms |
| 73 | 200 ohms |

Figure 4:
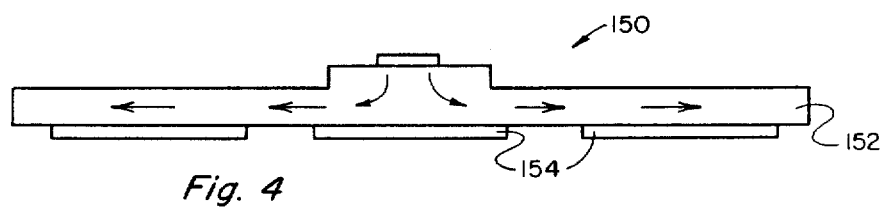
FIG. 4 is a graph showing the frequency response characteristics of the feedback section of the apparatus of FIG. 1.

FIG. 4 illustrates the frequency response characteristics obtained with a feedback section as illustrated in FIG. 2.

Figure 3:
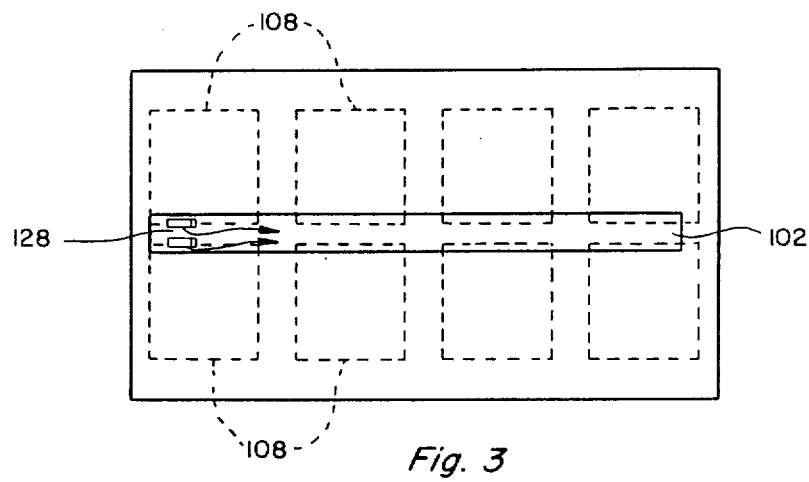
FIG. 3 is a schematic circuit diagram of a feedforward section of the apparatus of FIG. 1.

FIG. 3 is a circuit diagram of the feedforward section 34 which has its output terminal 36 connected to the electrode 38 of the Pockels Cell 14. Two MOSFETs 75 and 76 are connected in series relation and are switched from a non-conductive state to a conductive state to discharge a capacitor 78 in a manner such as to produce a decreasing ramp voltage at the output terminal 36 during development of a laser pulse. Capacitor 78 is connected through a diode 79 to the output terminal 36 and is connected through a resistor 80 to the power supply terminal 40, to be charged through resistor 80 to a potential which is substantially equal to that of the power supply terminal prior to the beginning of development of a laser pulse, the diode 80 being then conductive to maintain the output terminal 36 at substantially the same potential.

Within a short time after application of a synchronizing pulse to the circuit, the MOSFETs 75 and 76 are switched to a conductive state, to start discharging the capacitor 78 and drop the voltage at the output terminal 36. In particular, the source of the lower MOSFET 75 as illustrated is connected through an adjustable resistor 82 to ground while the drain of the upper MOSFET 76 is connected through a resistor 83 to the output terminal 36 and through a resistor 84 to the output terminal 40. When the MOSFETs 75 and 76 conduct, part of the current flow therethough is through the resistor 84 from the power supply and the remaining part is through the resistor 83 and the diode 79 from the capacitor 78 to discharge the capacitor 78 and drop the output voltage. The rate of drop of the output voltage is thus determined primarily by the values of capacitor 78 and resistors 83 and 84 and the current through the MOSFETs 75 and 76.

Two MOSFETs are used in series for control of output voltage at a level higher than the rated voltage of one MOSFET and a gate control arrangement is provided for simultaneously switching both MOSFETs into conduction and achieving a substantially equal division of voltage therebetween. As shown, the gate of the lower MOSFET 75 is connected to one terminal of a secondary winding 85 of a transformer 86, the other terminal of winding 85 being connected to ground and a resistor 87 being connected in parallel with the winding 85.

A triggering pulse is applied to a primary winding 88 of the transformer 86, to initiate conduction of the lower MOSFET 75. The gate of the upper MOSFET 76 is connected through a resistor 89 to the source of the lower MOSFET 75 and through a resistor 90 to the drain of the upper MOSFET 76. Capacitors 91 and 92 are connected in parallel with resistors 89 and 90 and a pair of capacitors 93 and 94 are connected in parallel with the adjustable resistor 82.

An important feature is that during repeated cycles of operation, the capacitors 93 and 94 are charged to a certain average level to reduce the average voltage cross the MOSFETs 75 and 76 and the current therethrough. For example, with a supply voltage of 1200 to 1300 volts at the terminal 40, the average voltage across the capacitors 93 and 94 may be on the order of 200 to 300 volts.

During conduction of the MOSFETs 75 and 76, a voltage dividing action is provided by the resistors 89 and 90 and associated capacitors 91 and 92, to control the potential of the gate of the upper MOSFET 76 and to maintain a balance between the voltages across the two MOSFETs so as to prevent an excessive voltage from being developed across either MOSFET.

As illustrative diagrammatically, ferrite beads 96 may surround the conductor leading to the gate of the upper MOSFET 76 and to provide a choke to minimize the effect of very high frequency transients. A pair of filter or by-pass capacitors 97 and 98 are connected between power supply terminal 40 and ground.

The forwardfeed section 34 further includes circuitry for applying a pulse of a certain duration to the primary winding 88 of the transformer 86 in response to an input synchronizing pulse applied to the input terminal 45. A driver transistor 100 is provided having its collector connected to the power supply terminal 53 and having its emitter connected to ground through a load resistor 101. One end of the primary winding 88 is connected to the emitter of transistor 100 through a coupling capacitor 102 and the other end thereof is grounded with a diode 103 being connected in parallel with the winding 88.

The base of the transistor 100 is connected through a resistor 105 to the power supply terminal 53, to be normally biased to a conductive condition and to develop a certain voltage across the emitter resistor 101 and charge the capacitor 102 through the diode 103 and the primary winding 88. To develop a drive pulse for the MOSFET 75, conduction of the transistor 100 is cut-off for a certain time interval, causing the capacitor 102 to discharge through the primary winding 88 and to develop a voltage across the secondary winding, proportional to the voltage across the capacitor 102. At the end of the time interval, the diode 103 provide a path for flow of current from stored energy stored in the transformer 86, to prevent the development of an inverse polarity voltage of high magnitude across the secondary winding 85.

To drive the base of transistor 100, it is connected to the output of an operational amplifier 106 and through a resistor 107 to an input of the amplifier 106 which is coupled to the input terminal 45 and also through a resistor 109 and a diode 110 to ground. The other input of the amplifier 106 is connected to the movable contact of a potentiometer 112 which is connected between ground and the power supply terminal 106, to be biased to a certain positive level. When the input pulse exceeds a certain amplitude, as determined by the position of adjustment of the contact of potentiometer 112, the amplifier 106 applies a an output signal to the base of the transistor to cause development a positive voltage at the gate of the MOSFET 75 in the manner as described above. The duration of the input signal may be controlled to control the duration of the time of conduction of the MOSFETs 75 and 76 and the duration of the laser pulse.

By way of illustrative example, and not by way of limitation, the types and values of the illustrated components of the feedforward section 34 may be as follows:

| Reference numeral | Type or value |
| --- | --- |
| 75,76 | MTM1N95 MOSFET |
| 80 | 1.0 megohms |
| 83 | 470 ohms |
| 84 | 270 ohms |
| 87 | 100 ohms |
| 89 | 490 Kohms |
| 90 | 490 Kohms |
| 91 | 470 picofarads |
| 92 | 330 picofarads |
| 93 | 10 microfarads |
| 94 | 0.1 microfarads |
| 100 | 2N2219 |
| 102 | 2.2 microfarads |
| 105 | 1000 ohms |
| 106 | 311 OP-AMP |
| 107 | 10000 ohms |
| 109 | 47 ohms |
| 112 | 1000 ohms |

The value of capacitor 78 is dependent upon output pulse duration and, for example, may be from 50,000 to 200,000 picofarads for durations of from 1 to 10 microseconds. In constructing the apparatus, the feedback section 33 and the feedforward section 34 are preferably on separate circuit boards or cards to provide isolation therebetween. Each card preferably has a conductive ground plane covering substantially the entire surface of one side thereof and each power supply lead is preferably bypassed to ground as close as possible to the amplifier pins. Resistors of low value and short leads are used to minimize time constants and to enhance performance at high frequencies. As aforementioned, the response characteristics of the feedback section are shown in FIG. 4 and it is noted that has a 400 megahertz gain-bandwidth product with a phase margin sufficient to keep from going into oscillation between DC and 20 megahertz. The maximum peak-to-peak voltage at 10 megahertz is about 200 volts.

Figure 5:
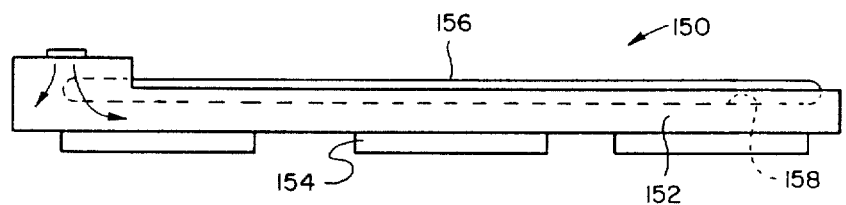
FIG. 5 is a graph showing the variations of laser light output, a feedforward voltage and a feedback voltage with time, in an apparatus constructed in accordance with the invention.
Figure 6:
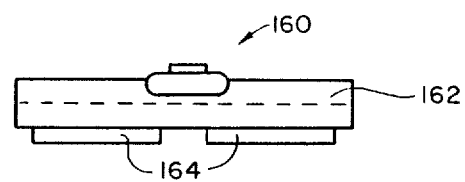
Figure 5:
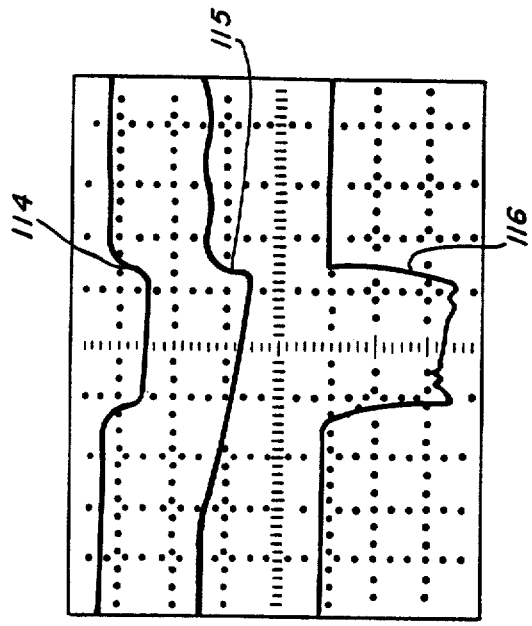
Figure 4:
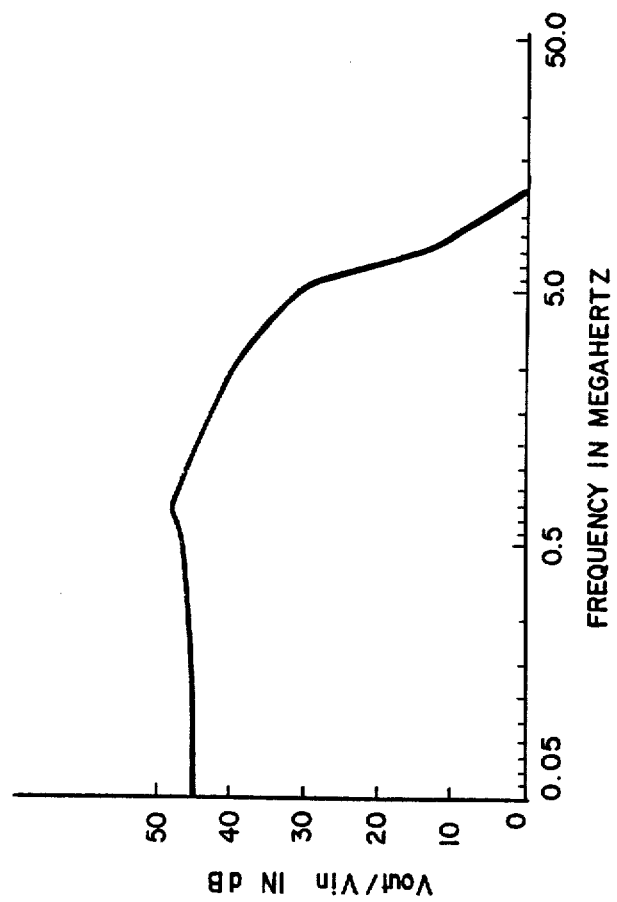

In FIG. 5 the laser light output, feedforward voltage obtained at terminal 36 and feedback voltage obtained at terminal 35 are respectively indicated by the curves 114, 115 and 116. Rectangular laser pulses of substantially rectangular form may be generated having a duration of from 2 to 10 or more microseconds, with a high frequency ripple of less than 20% of the average intensity.

The apparatus may be used in holography in big bubble chambers, to avoid the parasitic microboiling produced with conventional systems having no pulse-stretching operation. It may be used to advantage in a number of other applications. Since the power density of a stretched pulse is much less than that of a Q-switched pulse, stretched pulses are more desirable for transporting light through mono- or multi-mode optical fibers.

It will be understood that modifications and variations may be effected without departing from the spirit and scope of the novel concepts of this invention.

We claim:

1. A laser system including an oscillator stage, control means for initiating operation of said oscillator stage, and a Pockels Cell associated with said oscillator stage to control the intensity of the laser light developed by said oscillator stage, said control means being arranged for supplying a synchronizing pulse in timed relation to the initiation of operation of said oscillator stage, and control apparatus for control of said oscillator stage, the improvements comprising: photocell means in said control apparatus for monitoring the output of said oscillator stage, feedback means in said control apparatus coupled to said photocell means of said control apparatus and to said Pockels Cell of said oscillator stage to respond to changes in the light output of said oscillator stage and control said Pockels Cell to change the light output of said oscillator stage in an inverse direction, and feedforward means in said control apparatus responsive to said synchronizing pulse to cooperate with said feedback means in the control of said Pockels Cell and to maintain the light output of said oscillator stage means constant to within certain limits for an extended time interval.

2. Control apparatus as defined in claim 1, wherein said Pockels Cell has two electrodes, said feedback means being coupled to one of said electrodes and said feedforward means being connected to the other of said electrodes.

3. Control apparatus as defined in claim 1, said feedforward means being arranged to apply a voltage to said Pockels Cell having an amplitude which varies with time and which is within a range such as to permit said feedback means to control the light output of said oscillator stage means.

4. Control apparatus as defined in claim 3, wherein said voltage applied by said feedforward means is a ramp voltage having a magnitude which decreases as a function of elapsed time after application of said synchronizing pulse to said feedforward means.

5. Control apparatus as defined in claim 4, wherein said feedforward means comprises a ramp circuit coupled to a voltage source and including a capacitor for developing a ramp voltage thereacross, and current control means in circuit with said capacitor for controlling the rate of change of charge of said capacitor.

6. Control apparatus as defined in claim 5, wherein said current control means comprises a MOSFET device.

7. Control apparatus as defined in claim 6, wherein said current control means comprises two MOSFET devices connected in series, and means for switching both of said MOSFET devices between conductive and non-conductive states at substantially the same time while equalizing the voltages thereacross.

8. Control apparatus as defined in claim 7, wherein each of said MOSFET devices includes a gate electrode for control of conduction thereof, means responsive to said synchronizing pulse and coupled to said gate electrode of one of said MOSFET devices to control switching thereof between conductive and nonconductive states, and an equalizing circuit connected in circuit with said one of said MOSFET devices and connected to the gate electrode of the other of said MOSFET devices to control switching thereof between conductive and non-conductive states.

9. Control apparatus as defined in claim 8, wherein said equalizing circuit comprises a pair of resistances connected in series between opposite ends of the series combination of said MOSFET devices, and a coupling between the junction of said resistances and said gate electrode of said other of said MOSFET devices.

10. Control apparatus as defined in claim 9, wherein said equalizing circuit further includes a pair of capacitances connected respectively in parallel with said pair of resistances.

11. Control apparatus as defined in claim 5 wherein said ramp circuit further includes first resistance means coupled between said capacitor and said voltage source for charging said capacitor to a voltage approaching that of said source prior to initiation of operation of said oscillator stage, and second resistance means coupling said capacitor to said current control means.

12. Control apparatus as defined in claim 11, wherein said ramp circuit further includes a diode connected between said capacitor and said second resistance means, and means coupling the junction between said diode and said capacitor to said Pockels Cell.

13. Control apparatus as defined in claim 1, wherein said feedback means comprises input means for responding to said output voltage of said photocell means to develop a control voltage, and amplifier means for responding to said control voltage from said input means to control said Pockels Cell.

14. Control apparatus as defined in claim 13, wherein said input means comprises a fast slewing differential amplifier.

15. Control apparatus as defined in claim 14, wherein said amplifier means comprises a MOSFET device having a fast response characteristic and operative to provide a high voltage output to said Pockels Cell.

16. Control apparatus as defined in claim 13, wherein said input means comprises means for developing a reference voltage, and means for comparing said output voltage of said photocell means and said reference voltage to develop said control voltage.

17. Control apparatus as defined in claim 13, wherein said input means comprises means for developing a reference voltage, and means for comparing said output voltage of said photocell means and said reference voltage to develop said control voltage.

18. Control apparatus as defined in claim 5, wherein said current control means comprises at least one current control device, resistance means in series with said device, and capacitance means in parallel with said resistance means, said capacitance means being charged to a certain average level during repeated cycles of operation to limit the voltage across said device and the current flow therethrough.

19. Control apparatus as defined in claim 18, wherein said current control device is a MOSFET device.

20. Control apparatus as defined in claim 19, wherein said current control means includes at least one additional MOSFET device in series with said MOSFET device and said resistance and capacitance means.

* * * * *